United States Patent [19]

Tanaka et al.

[11] Patent Number: 5,043,305
[45] Date of Patent: Aug. 27, 1991

[54] HIGH THERMAL EXPANSION COEFFICIENT CERAMIC SINTER AND A COMPOSITE BODY OF THE SAME AND METAL

[75] Inventors: Akira Tanaka; Tadahiko Miyoshi, both of Hitachi, Japan

[73] Assignee: Hitachi, Ltd., Tokyo, Japan

[21] Appl. No.: 938,796

[22] Filed: Dec. 8, 1986

[30] Foreign Application Priority Data

Dec. 6, 1985 [JP] Japan ................................ 60-273262
Feb. 3, 1986 [JP] Japan .................................. 61-20126

[51] Int. Cl.$^5$ ...................... C04B 35/04; C04B 35/10; C04B 35/46; C04B 35/48
[52] U.S. Cl. .................................. 501/103; 501/104; 501/105; 501/108; 501/112; 501/118; 501/119; 501/121; 501/123; 501/125; 501/126; 501/127; 501/134; 501/135; 501/136; 501/137; 501/138; 501/139; 501/151; 501/153
[58] Field of Search ............... 501/103, 104, 105, 108, 501/112, 118, 119, 121, 123, 125, 126, 127, 134, 135, 136, 137, 138, 139, 151, 153

[56] References Cited

U.S. PATENT DOCUMENTS 2,935,411  5/1960  Robinson ............................ 501/137
3,862,046  1/1975  Walker, Jr. et al. ................ 501/151

Primary Examiner—William R. Dixon, Jr.
Assistant Examiner—Anthony J. Green
Attorney, Agent, or Firm—Antonelli, Terry, Stout & Kraus

[57] ABSTRACT

The ceramic sinter is composed of a metal oxide such as $ZrO_2$ and 10–90 vol. % of metal fluoride which is selected from the group having not less than 2.5 electronegativity difference between fluoride and the metal element.

The ceramic sinter has a thermal expansion coefficient of $15-20 \times 10^{-6}/°C$. and is suitable for bonding with general use metals such as stainless steel to form a composite body of the ceramic sinter and the metal without causing a substantial thermal stress at the juncture thereof.

8 Claims, 2 Drawing Sheets

HIGH THERMAL EXPANSION COEFFICIENT CERAMIC SINTER AND A COMPOSITE BODY OF THE SAME AND METAL

BACKGROUND OF THE INVENTION

1. Fields of the Invention

The present invention relates to a ceramic sinter having a high thermal expansion coefficient combinable with a general use metal such as stainless steel so as to constitute a composite body applicable under a high temperature circumstance

2. Description of Prior Art

Ceramics are being increasingly used in many field because of their excellent thermal and chemical properties such as heat resistance and corrosion resistance and replaced for metal material in some fields so that performance limits of machines are improved. However workability, toughness and thermal shock resistance of the ceramics are lower than those of metal material. To overcome these disadvantages, a composite body of ceramic and metal is proposed, in that, for the portion which requires a high heat resistance and a high corrosion resistance ceramics are employed and for the portion which requires a high toughness and a complex configuration metal materials are employed.

Japanese Patent Publication No. 60-29668, for example, discloses a composite body of a ferrite core and a ceramic supporting the same for a magnetic head, the ceramic essentially consists of $TiO_2$, $BaO$, $SiO_2$, $Nb_2O_5$ and $ZnO$ and has a thermal expansion coefficient of $6-12\times10^{-6}/°C.$ which agrees with that of the ferrite core.

Japanese Patent Publication No. 60-18621, for example, discloses a composite body of a cast iron and a ceramic bonded thereto for an internal combustion engine part, the ceramic essentially consists of partly stabilized zirconia and has a thermal expansion coefficient of $10.3\times10^{-6}/°C.$ which is substantially equivalent to that of cast iron.

However, until now no such ceramics having a thermal expansion coefficient of more than $13\times10^{-6}°C.$ and a high flexural strength required for structural components are disclosed that are used in combination with general use metals such as carbon steel, of which the thermal expansion coefficient is $13-14\times10^{-6}/°C.$, alloy steel, of which the thermal expansion coefficient is $8-20\times10^{-6}/°C.$, and stainless steel, of which the thermal expansion coefficient is $15-20\times10^{-6}/°C.$

SUMMARY OF THE INVENTION

One object of the present invention is to provide a ceramic sinter having a thermal expansion coefficient of $10-20\times10^{-6}/°C.$ and a high flexural strength needed for structural components and being combinable with general use metals such as cast iron, cast steel, carbon steel, alloy steel, stainless steel, nickel and alloys thereof, copper and alloys thereof, cobalt base alloys, aluminum alloys and Fe system, Co system or Ni system amorphous alloys so as to constitute a composite body.

Another object of the present invention is to provide a reliable composite body formed of a ceramic sinter and a metal having a high flexural strength at the juncture portion thereof.

The ceramic sinter before sintering of the present invention essentially consists of a metal oxide and 10–90 vol.% of a metal fluoride having not less than 2.5 electronegativity difference of the fluorine from the metal element thereof. A ceramic sinter having a thermal expansion coefficient of $10-20\times10^{-6}/°C.$ and a high flexural strength is obtained.

The metal oxide such as $Al_2O_3$, $MgO$, $ZrO_2$, $BaTiO_3$, $GeO_2$, $Fe_2O_3$, $WO_3$, $CaTiO_3$ and $MgFe_2O_4$ is added for maintaining the mechanical properties of the ceramic sinter of the present invention at a predetermined value.

The metal fluoride is added for improving the thermal expansion coefficient of the ceramic sinter of the present invention. Since the electronegativity difference between fluorine and the metal element of the metal fluoride of the present invention is not less than 2.5, the metal fluoride of the present invention is rich in ionic bond which indicates a large thermal expansion coefficient. Examples of the metal fluoride of the present invention having electronegativity difference of not less than 2.5 are $CaF_2$, $MgF_2$, $SrF_2$, $AlF_3$, $ScF_3$, $YF_3$, $LaF_3$, $CeF_3$, $YbF_3$, $NbF_3$, $SmF_3$ and $EuF_3$.

Further the metal flouride used in the present invention works as a sintering aid during sintering and as a solder during bonding with the metal. In addition since the gravity of the metal fluoride is lower than that of the metal oxide, the addition of the metal fluoride improves the gravity of the resultant ceramic sinter.

When the amount of the metal fluoride prepared before sintering is less than 10 vol.%, the thermal expansion coefficient of the resultant ceramic sinter of the present invention is not improved and further the effect as a solder of the metal fluoride in the ceramic sinter during bonding with the metal component is reduced. When the amount of metal fluoride is more than 90 vol.%, the mechanical properties of the resultant ceramic sinter required for a structural component are not attained.

The metal fluorides of $CaF_2$, $SrF_2$ and $ScF_3$ further improve the corrosion resistance of the resultant ceramic sinter of the present invention.

The metal fluorides of $CaF_2$, $SrF_2$, $YbF_3$, $ScF_3$, $CeF_3$, $NbF_3$, $SmF_3$ and $EuF_3$ further improve the heat resistance and the mechanical strength of the resultant ceramic sinter.

The metal oxide of partly stabilized $ZrO_2$ further improves the mechanical strength of the resultant ceramic sinter.

After preparing a mixed powder of the metal oxide and metal fluoride of a predetermined composition ratio, the mixed powder is press-formed and then held at 900-1400° C. for 0.5-3 hours, thereby producing the ceramic sinter of the present invention having a thermal expansion coefficient of $10-20\times10^{-6}/°C.$, preferably of $15-20\times10^{-6}/°C.$, and a sufficient mechanical strength.

With respect to the particle diameter in the ceramic sinter thus produced, the smaller the better, in that, the mechanical strength and the heat cycle resistance of the ceramic sinter are much enhanced. The particle diameter of the ceramic sinter is preferably controlled to less than 2 μm in practice.

The thermal expansion coefficient of the ceramic sinter of the present invention is adjustable within $10-20\times10^{-6}/°C.$ by controlling the composition ratio of the metal fluoride therein while maintaining the mechanical strength substantially constant so as to match with that of the metal to the bond.

The ceramic sinter of the present invention and the general use metal such as carbon steel, alloy steel and stainless steel are bonded through any known method, for example, after metallizing the metal surface to be bonded, both the ceramic sinter and the metal are contact-bonded in a vacuum at a temperature of 1,000–1,300° C., so that the composite body of the ceramic sinter and the metal of the present invention is obtained.

The thermal expansion coefficient of the ceramic sinter to be bonded to a specific general use metal is adjusted to be substantially the same with that of the specific metal or slightly lower than that of the metal, but the difference between both is limited to less than $2.0 \times 10^{-6}$/°C. so as to induce a compressive stress in the ceramic sinter of the composite body of the present invention.

The thermal stress at the juncture portion of the composite body of the present invention due to the thermal expansion coefficient difference between the ceramic sinter and the metal is substantially eliminated to improve the flexural strength at the juncture portion so that reliability of the composite body of the present invention is enhanced.

Further the metal fluoride in the ceramic sinter acts as a solder during bonding with the metal and, therefore, the flexural strength at the juncture portion of the composite body is further enhanced.

In the composite body of the present invention, when stainless steel is employed for the metal portion, a composite body having an excellent mechanical strength and corrosion resistance is obtained, and when a Ni base alloy or a Co base alloy is employed, a composite body having an excellent mechanical strength and heat resistance is obtained.

DESCRIPTION OF THE EMBODIMENTS

Figure 2:
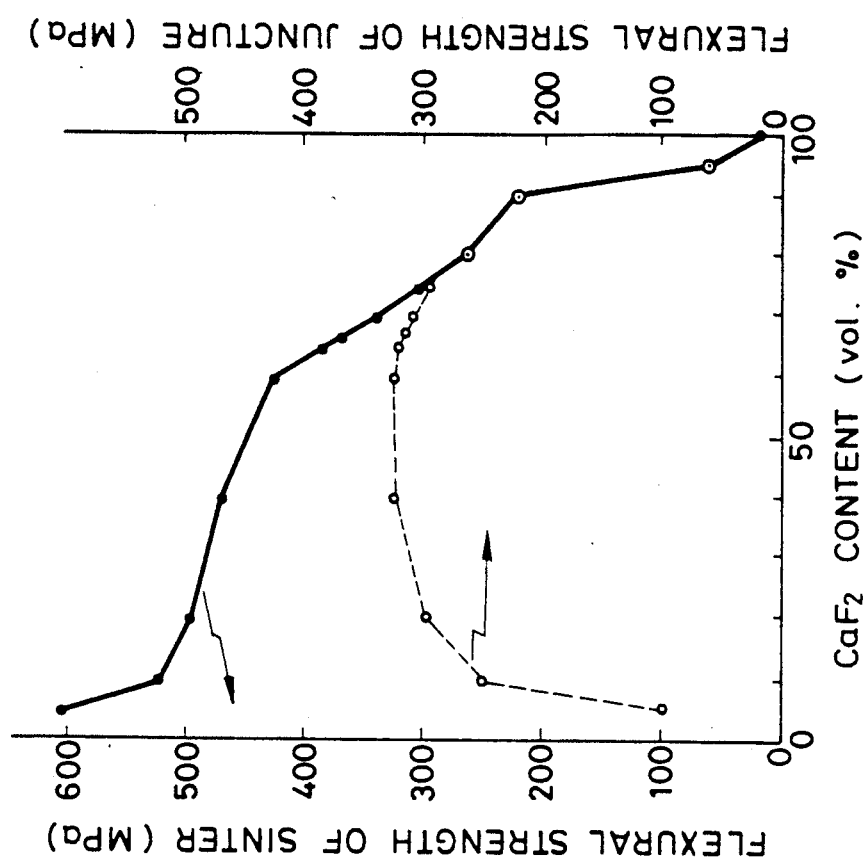
FIG. 2 shows a graph illustrating a relationship between flexural strength and $CaF_2$ content in a $ZrO_2/CaF_2$ ceramic sinter, one embodiment of the present invention and further a relationship between flexural strength of the juncture of the composite body of one embodiment of the present invention and $CaF_2$ content in the ceramic sinter.

The present invention will be explained in the following description with reference to the embodiments.

The thermal expansion coefficient, flexural strength, oxidation resistance, alkali resistance and water resistance of the ceramics shown in the following examples were examined by the following method:

Thermal expansion coefficient . . . Measuring temperature was set in the range of room temperature to 500° C. in consideration that the ceramic body will be bonded to a metal material such as stainless steel, and an average thermal expansion coefficient therebetween was calculated.

Flexural strength . . . Flexural strengths were measured by a four point flexural strength test meter at room temperature.

Oxidation resistance . . . Change in weight per unit area was examined after the ceramic sinter had been left for 24 hours at 1,000° C. and atmospheric pressure.

Alkali resistance . . . Change in weight was examined after the ceramic sinter had been immersed in 3 % NaOH water solution at 70° C. for 12 hours.

Water resistance . . . Change in weight was examined after the ceramic sinter had been immersed in pure water at 70° C. for 12 hours.

EXAMPLES 1–33

Powdered materials selected from the group consisting of $Al_2O_3$, $ZrO_2$, $BaTiO_3$ and the group consisting of $CaF_2$, $MgF_3$, $AlF_3$, $YF_3$ and $LaF_3$ were weighed so as to have the respective compositions of Examples 1 to 33 shown in Tables 1, 2 and 4. The content of a metal fluoride was determined to be 10 to 90 vol.%. If it is less than 10 vol.%, the effect on increasing the thermal expansion coefficient and the effect as a soldering material at the time of bonding with a metal are small, while if it is more than 90 vol.%, it is impossible to obtain the practical mechanical strength with the ceramic sinter. The mixture powder of a metal oxide and a metal fluoride was pulverized and mixed in a ball mill more than twenty hours, and preferably 40–80 hours, with a solvent added thereto, and thereafter the mixture was adequately dried to produce a powdered material. In this way, the particle diameter of either of the metal oxide and the metal fluoride or both was made to be less than 0.5 μm to lower the sintering temperature and to make the resultant sinter dense. The powdered material was press-formed and the press-formed body was pressurized at a temperature between 900 to 1,400° C. under a pressure of 300 kg/mm² and was held for 0.5 to 3 hours, thereby obtaining a ceramic sinter having a particle diameter of less than 2 μm. Respective test pieces were obtained from the ceramic sinter. In these examples, $ZrO_2$ powdered material contained 4 mol% of $Y_2O_3$, but it may contain 1 to 8 mol% of $Y_2O_3$.

TABLE 1

| Example No. | Composition Oxide | Vol. % | Fluoride | Vol. % | Thermal Expansion Coefficient ($\times 10^{-6}$/°C.) | Flexural Strength (MPa) |
| --- | --- | --- | --- | --- | --- | --- |
| 1 | $BaTiO_3$ | 20 | $CaF_2$ | 80 | 19.3 | 108 |
| 2 | $BaTiO_3$ | 25 | $CaF_2$ | 75 | 19.1 | 120 |
| 3 | $ZrO_2$ | 20 | $CaF_2$ | 80 | 18.7 | 260 |
| 4 | $ZrO_2$ | 30 | $CaF_2$ | 70 | 17.5 | 338 |
| 5 | $Al_2O_3$ | 30 | $CaF_2$ | 70 | 16.5 | 165 |
| 6 | $BaTiO_3$ | 50 | $CaF_2$ | 50 | 16.2 | 160 |
| 7 | $ZrO_2$ | 40 | $CaF_2$ | 60 | 15.5 | 427 |
| 8 | $ZrO_2$ | 30 | $AlF_3$ | 70 | 15.3 | 319 |
| 9 | $BaTiO_3$ | 75 | $CaF_2$ | 25 | 14.2 | 203 |
| 10 | $ZrO_2$ | 35 | $YF_3$ | 65 | 14.0 | 315 |
| 11 | $Al_2O_3$ | 30 | $MgF_2$ | 70 | 13.6 | 148 |
| 12 | $Al_2O_3$ | 50 | $CaF_2$ | 50 | 13.4 | 261 |
| 13 | $BaTiO_3$ | 60 | $AlF_3$ | 40 | 13.1 | 152 |
| 14 | $BaTiO_3$ | 50 | $LaF_2$ | 50 | 13.0 | 137 |
| 15 | $ZrO_2$ | 50 | $MgF_2$ | 50 | 13.0 | 435 |
| 31 | $ZrO_2$ | 10 | $CaF_2$ | 90 | 20.0 | 220 |
| 32 | $BaTiO_3$ | 10 | $ScF_3$ | 90 | 20.0 | 170 |
| 33 | $BaTiO_3$ | 90 | $ScF_3$ | 10 | 11.2 | 150 |

TABLE 2

| Comparative Example No. | Composition | Thermal Expansion Coefficient ($\times 10^{-6}$/°C.) | Flexural Strength (MPa) |
| --- | --- | --- | --- |

TABLE 2-continued

| | Composition | Thermal Expansion Coefficient ($\times 10^{-6}$/°C.) | Flexural Strength (MPa) |
|---|---|---|---|
| 1 | MgO | 12.5 | 170 |
| 2 | BaTiO$_3$ | 11.3 | 231 |
| 3 | 2MgO.SiO$_2$ | 10.3 | 137 |
| 4 | ZrO$_2$ | 10.2 | 1000 |
| 5 | Al$_2$O$_3$ | 7.0 | 390 |
| Reference Example No. | Carbon Steel | | |
| | C (%) | Mn (%) | Si (%) | | |
| 1 | 0.06 | 0.38 | 0.01 | 14.2 | — |
| 2 | 0.42 | 0.64 | 0.11 | 14.0 | — |
| 3 | 0.80 | 0.32 | 0.13 | 13.6 | — |
| | Alloy Steel | | |
| 4 | SAE No. 1145 (Free cutting steel) | 14.2 | — |
| 5 | SAE No. 52100 (Bearing steel) | 14.2 | — |
| 6 | SAE No. 1340 (Mn steel) | 13.1 | — |
| | Stainless Steel | | |
| 7 | SUS 302 | 18.1 | — |
| 8 | SUS 308L | 17.0 | — |
| 9 | SUS 310S | 16.7 | — |
| 10 | SUS 316 | 15.5 | — |
| | Alloy | | |
| 11 | Cu/Al (8.4%) | 19.0 | — |
| 12 | Monel (Ni/Cu) | 18.0 | — |
| 13 | Fe amorphous alloy | 17.5 | — |

Table 1 shows examples of high-thermal-expansion-coefficient ceramic sinters obtained by the above-described method as Examples 1 to 15 and 31 to 33. Table 2 shows conventional ceramics which have a large thermal expansion coefficient and are used in practice as Comparative Examples 1 to 5. All the ceramic sinters of Examples 1 to 15 and 31 to 33 exhibit larger thermal expansion coefficient than those of Comparative Examples 1 to 5. With respect to Examples 9 to 15, the thermal expansion coefficient is as large as $13 \times 10^{-6}$/° C. to $15 \times 10^{-6}$/° C., which is approximately the same as those of the carbon steels shown in Reference Examples 1 to 3 and the alloy steels shown in Reference Examples 4 to 6 in Table 2. The thermal expansion coefficients of the ceramic sinters of Examples 1 to 8 are more than $15 \times 10^{-6}$/° C., which is approximately the same as those of the stainless steels shown in Reference Examples 7 to 10 in Table 2. Furthermore, the thermal expansion coefficients of the ceramic sinters of Examples 1 to 4 are more than $17.5 \times 10^{-6}$/° C., which is approximately the same as those of the alloys shown in Reference Examples 11 to 13 in Table 2. From these results it is clear that it is possible to select an appropriate high thermal expansion coefficient ceramic sinter in accordance with respective thermal expansion coefficients of general use metals such as carbon steel, alloy steel, stainless steel and alloys.

TABLE 3

| | Composition | | | | Oxidation Resistance | Alkali | Water |
|---|---|---|---|---|---|---|---|
| | Oxide | Vol. % | Fluoride | Vol. % | (mg/cm$^2$) | Resistance | Resistance |
| Example No. | | | | | | | |
| 2 | BaTiO$_3$ | 25 | CaF$_2$ | 75 | −0.7 | No abnormality | No abnormality |
| 6 | BaTiO$_3$ | 50 | CaF$_2$ | 50 | −0.9 | No abnormality | No abnormality |
| 18 | ZrO$_2$ | 25 | CaF$_2$ | 75 | −1.3 | No abnormality | No abnormality |
| 19 | ZrO$_2$ | 75 | CaF$_2$ | 25 | −1.5 | No abnormality | No abnormality |
| 20 | Al$_2$O$_3$ | 25 | CaF$_2$ | 75 | −3.2 | No abnormality | No abnormality |
| 21 | Al$_2$O$_3$ | 50 | MgF$_2$ | 50 | −7.0 | No abnormality | No abnormality |
| 22 | ZrO$_2$ | 50 | AlF$_3$ | 50 | −7.2 | No abnormality | No abnormality |
| 23 | BaTiO$_3$ | 50 | CaF$_2$ | 50 | −7.3 | No abnormality | No abnormality |
| Comparative Example No. | | | | | | | |
| 1 | | | MgO | | +0.1 | No abnormality | No abnormality |
| 4 | | | ZrO$_2$ | | Stable | No abnormality | No abnormality |
| 5 | | | Al$_2$O$_3$ | | Stable | No abnormality | No abnormality |

Table 3 shows the oxidation resistance, alkali resistance and water resistance of the ceramic sinters of the present invention as Examples 2, 6, and 18-23. These properties are equivalent to the oxides of Comparative Examples 1, 4, and 5 shown in Table 3. Especially, the ceramic sinters which were obtained by using CaF$_2$ as a metal fluoride exhibit excellent properties.

TABLE 4

| Example No. | Composition | | | | Thermal Expansion Coefficient ($\times 10^{-6}$/°C.) | Flexural Strength (MPa) |
|---|---|---|---|---|---|---|
| | Oxide | Vol. % | Fluoride | Vol. % | | |
| 18 | ZrO$_2$ | 25 | CaF$_2$ | 75 | 18.1 | 301 |
| 25 | ZrO$_2$ | 33 | CaF$_2$ | 67 | 17.0 | 370 |
| 26 | ZrO$_2$ | 35 | CaF$_2$ | 65 | 16.7 | 385 |
| 27 | ZrO$_2$ | 28 | AlF$_3$ | 73 | 15.5 | 308 |
| 28 | ZrO$_2$ | 40 | MgF$_2$ | 60 | 14.2 | 352 |
| 29 | ZrO$_2$ | 50 | AlF$_3$ | 50 | 13.6 | 498 |
| 30 | ZrO$_2$ | 40 | LaF$_3$ | 60 | 13.1 | 343 |

Table 4 shows examples of the ceramic sinters as Examples 18 and 25-30, which have a flexural strength of more than 300 MPa, which is approximately the same as that of Al$_2$O$_3$ ceramics which are widely used. These ceramic sinters are superior both in thermal expansion coefficient and flexural strength than those of Comparative Examples 1 to 3 shown in Table 2. It is possible to vary the thermal expansion coefficient as desired between 13 to $18 \times 10^{-6}$/° C. by varying the kinds of the metal fluorides and to obtain the value approximately the same as those of the stainless steels of Reference Examples 7 and 8 shown in Table 2 while maintaining the flexural strength at more than 300 MPa, which is a practically sufficient value.

Figure 1:
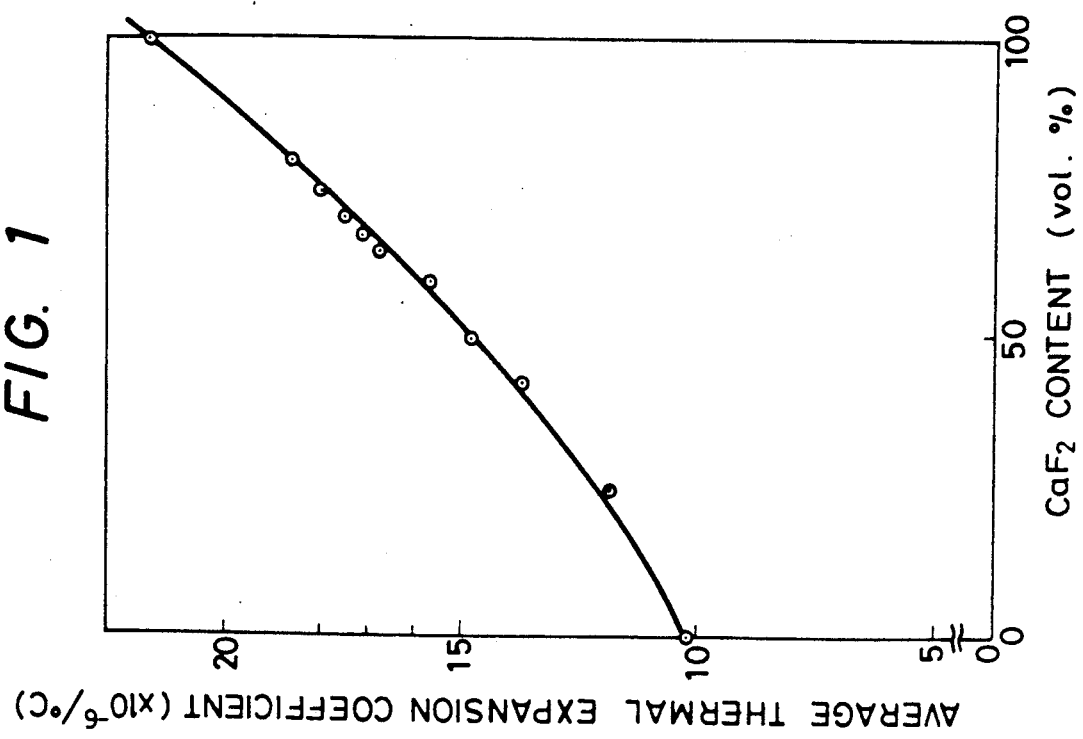
FIG. 1 shows a graph illustrating a relationship between the average thermal expansion coefficient and $CaF_2$ content in a $ZrO_2/CaF_2$ ceramic sinter, one embodiment of the present invention.

FIG. 1 shows a thermal expansion coefficient curve of the ceramic sinters at a temperature between room temperature and 500° C. obtained when the volume ratio of CaF$_2$ powder to be added with ZrO$_2$ powder is varied. As is clear from FIG. 1, when a ceramic sinter having the thermal expansion coefficient approximately the same as that of SUS 308L is desired, for example, a powdered material is to be produced in the aforementioned way by adding 67 vol.% of CaF$_2$ to ZrO$_2$, so that the ceramic sinter as shown in Example 25 having the thermal expansion coefficient of $17 \times 10^{-6}/°$ C., which is approximately the same as that of SUS 308L, is obtained.

In this way, when the ceramic sinter is used in combination with a metal material such as carbon steel, alloy steel and stainless steel, and when the thermal expansion coefficient of the metal material which is to be combined with the ceramic sinter is known, it is easy to select the mixture ratio of the metal oxide and the metal fluoride. The change in thermal expansion coefficient of the ceramic sinter of the present invention due to heat cycle is less than 0.5 %. For example, the difference in thermal expansion coefficient curve history due to temperature change between the ceramic sinter of Example 25 and SUS308L of Reference Example 8 was at most 5 %. As a result, it was able to bond these two members with the strain caused during the heating and cooling process for bonding being limited to as great an extent as possible, and after they were bonded, the juncture had a high reliability with respect to heat cycle.

FIG. 2 shows the flexural strength of a $ZrO_2/CaF_2$ ceramic sinter at room temperature and the flexural strength at the juncture of the composite body of the ceramics and an iron material (e.g., SUS, cast iron) having a similar thermal expansion coefficient in relation with $CaF_2$ content in the ceramics.

The flexural strength of the ceramic sinter is lowered with the increase in $CaF_2$ content. When the $CaF_2$ content is less than 75 vol.%, the flexural strength thereof is more than 300 MPa, which is a practical level for structural components, and when the $CaF_2$ content is less than 90 vol.%, the flexural strength thereof is more than 200 MPa, which is necessary for electronic components. However, when the $CaF_2$ content exceeds 90 vol.%, the flexural strength thereof is suddenly lowered. On the other hand, the flexural strength of the juncture of the composite body takes a practically sufficient value when the $CaF_2$ content is more than 10 vol.%. This is because $CaF_2$ serves as a soldering material. When the $CaF_2$ content exceeds 80 vol.%, the strength of the juncture agrees with that of the ceramic sinter and thereafter it is lowered with the increase in the $CaF_2$ content. This is because the strength of the juncture is subject to the strength of the ceramic sinter. A similar tendency was observed when other metal oxides and metal fluorides were combined.

TABLE 5

| Example No. | Metal Bonded (Thermal Expansion Coefficient) | Flexural Strength at Juncture (MPa) | |
|---|---|---|---|
| | | Before Heat Cycle Test | After Heat Cycle Test |
| 18 | Monel | 285 | 280 |
| 27 | SUS316 | 290 | 290 |
| 30 | SAE NO. 1340 | 321 | 320 |
| 28 | Ni base super alloy ($14 \times 10^{-6}/°$C.) | 341 | 342 |
| 27 | Co/V (1:1) ($15.5 \times 10^{-6}/°$C.) | 300 | 298 |
| 27 | Carbon steel ($15.5 \times 10^{-6}/°$C.) | 305 | 305 |
| 18 | Cu/Al (8.4%) ($19.0 \times 10^{-6}/°$C.) | 252 | 250 |

Table 5 shows flexural strength at junctures of composite bodies of the present invention formed by bonding the ceramic sinters of Examples 18, 27, 28 and 30 and the various kinds of metals as specified in Table 5 before heat cycle test and after they were subjected to 100 heat cycles between room temperature and 500° C.

When the composite body of a high thermal expansion coefficient ceramic and metal as a structural component was made, the following bonding method was adopted. When the ceramic sinter was bonded to an iron metal such as stainless steel or carbon steel, Ti/Ni alloy was metallized on the surface of the metal and the metal was contact bonded with the ceramic sinter in a vacuum at a temperature of 1,000 to 1,300 ° C.

When a ceramic sinter was bonded to a copper alloy, a paste containing kaolin and copper sulfide in a ratio of 1:1 is applied to the surface of the copper alloy and it was contact bonded with the ceramic sinter at a temperature of 1,000 to 1,300 ° C. in the flow of $N_2 + H_2$ gas. When a ceramic sinter was bonded to an Ni based or Co based alloy, the surface of the ceramic sinter was grounded smooth and they were contact bonded to the alloys in a vacuum at a temperature of 1,000 to 1,300 ° C. In place of metallizing, a vacuum heat bonding method using a stainless steel foil or an alloy foil as an insert material or a shrink fit method, which requires high precision for machining, may be adopted.

EXAMPLES 34–36

Powders of $SrF_2$ and $ZrO_2$ (containing 3 mol% $Y_2O_3$) were weighed out as indicated in Table 6 and put into a ball mill by adding a solvent; and they were pulverized and mixed for more than twenty hours and preferably 40–80 hours. Thereafter, the resultant mixture was sufficiently dried to form raw powder.

A particle diameter of the raw powder obtained in such a manner was 1 μm or less. This pulverizing operation contributes to decrease the sintering temperature and increase the density of the resultant ceramic sinter. This raw powder was press-formed and was then maintained at a temperature of 1000° C. to 1400° C. under a pressure of 30–50 MPa during a period of 1 to 3 hours, thereby obtaining a ceramic sinter the particle diameter of which was 2 μm or less. Table 6 shows the thermal expansion coefficient of the obtained ceramic sinter at a temperature of room temperature to 500° C., the flexural strength at room temperature of the resultant ceramic sinters and of the junctures of the composite bodies of the ceramics and SUS304 stainless steel before and after they were subjected to 100 heat cycles between room temperature and 1000° C.

No abnormal appearance was seen at the junctures of the composite bodies of the ceramic sinters and the metal shown in Examples 34–36 after subjecting the composite bodies to the heat cycle test. The flexural strength at the junctures changed slightly before and after the heat cycle test and was kept at their practical strength as compared with that of comparative Examples 4 and 6.

TABLE 6

| | Composition | | | Thermal Expansion Coefficient ($\times 10^{-6}/°C$) | Flexural Strength at Room Temperature (MPa) | | Flexural Strength of Juncture at Room Temperature (MPa) | |
|---|---|---|---|---|---|---|---|---|
| | Oxide | Vol. % | Fluoride | Vol. % | | Before Heat Cycle Test | After Heat Cycle Test | Before Heat Cycle Test | After Heat Cycle Test |

| | Oxide | Vol. % | Fluoride | Vol. % | Coeff. | Before | After | Before | After |
|---|---|---|---|---|---|---|---|---|---|
| Example No. | | | | | | | | | |
| 34 | $ZrO_2$ | 20 | $SrF_2$ | 80 | 18.0 | 300 | 250 | 220 | 200 |
| 35 | $ZrO_2$ | 50 | $SrF_2$ | 50 | 14.0 | 410 | 370 | 370 | 360 |
| 36 | $ZrO_2$ | 80 | $SrF_2$ | 50 | 11.5 | 530 | 450 | 320 | 300 |
| Comparative Example No. | | | | | | | | | |
| 6 | $ZrO_2$ | 0 | $SrF_2$ | 100 | 21.0 | 100 | 50 | 30 | 0 |
| 4 | $ZrO_2$ | 100 | $SrF_2$ | 0 | 10.2 | 1000 | 100 | 90 | 40 |

EXAMPLES 37–44

Composite bodies of ceramics and metals were formed in the same manner as that of Examples 34–36 employing $SrF_2$, $EuF_3$, $ScF_3$, $CaF_2$, $SmF_3$, $NbF_3$, $CeF_3$, and $YbF_3$ as the metal fluoride. For the metal portion of the composite bodies metal having a thermal expansion coefficient of $10-20 \times 10^{-6}/°C$. was selected. The ceramic portion being bonded to the metal portion was composed of one of the above metal fluorides and $ZrO_2$ as the metal oxide, and the composition ratio thereof was adjusted so that the thermal expansion coefficient of the ceramic portion became equal to that of the metal portion, or its difference came to $2 \times 10^{-6}/°C$. or less. Table 7 shows the thermal expansion coefficient of the ceramic portion, the flexural strength of the juncture portion at room temperature before and after being subjected to 100 heat cycles (room temperature to 500° C.) and the corrosion resistance. In Examples 37 to 44, the decrease in flexural strength after the heat cycle test was considerably small as compared with the comparative Example 4. In Comparative Examples 5 and 1 the juncture portion was separated after the heat cycle test. However, as contrasted with this, no abnormal appearance could be found out in Examples 37 to 44.

EXAMPLES 45–50

Composite bodies of ceramics and metals were formed in the same manner as that of Examples 34-36 by employing $CaF_2$ as the metal fluoride, and one of MgO, $GeO_2$, $FeO_3$, $WO_3$, $CaTiO_3$, and $MgFe_2O_4$ as the metal oxide. For the metal portion of the composite body metal having a thermal expansion coefficient of $10-20 \times 10^{-6}/°C$. were selected The ceramic portion to be bonded to the metal portion consisted of $CaF_2$ and one of the above metal oxides, and the composition ratio thereof was adjusted so that the thermal expansion coefficient of the ceramic portion became equal to that of the metal portion, or its difference was $2 \times 10^{-6}°$ C. or less. Table 8 shows the thermal expansion coefficient of the resultant ceramic sinter, the flexural strength of the juncture portion at the room temperature before and after being subjected to 100 heat cycles (room temperature to 500° C.). Examples 45 to 50 show, as in the case of the Examples 37 to 44 shown in Table 7, that the resistance to the thermal stress and the heat cycle fatigue of the juncture portion of the composite bodies were high as compared with comparative Examples 4, 5 and 1.

TABLE 7

| | Composition | | | | Thermal Expansion Coefficient ($\times 10^{-6}/°C$) | Metal Bonded | Flexural Strength of Juncture at Room Temperature (MPa) | | Corrosion Resistance |
|---|---|---|---|---|---|---|---|---|---|
| | Oxide | Vol. % | Fluoride | Vol. % | | | Before Heat Cycle Test | After Heat Cycle Test | |
| Example No. | | | | | | | | | |
| 37 | $ZrO_2$ | 10 | $SrF_2$ | 90 | 20.0 | Cu/Al | 250 | 230 | G |
| 38 | $ZrO_2$ | 20 | $EuF_2$ | 80 | 18.0 | Nonel | 260 | 250 | S |
| 39 | $ZrO_2$ | 25 | $ScF_3$ | 75 | 17.5 | Fe system amorphous alloy | 265 | 250 | G |
| 40 | $ZrO_2$ | 35 | $CaF_2$ | 65 | 16.3 | SUS 314 | 410 | 380 | G |
| 41 | $ZrO_2$ | 40 | $SmF_3$ | 60 | 15.5 | SUS 316 | 340 | 300 | S |
| 42 | $ZrO_2$ | 60 | $NbF_3$ | 40 | 14.2 | Carbon steel | 350 | 325 | S |
| 43 | $ZrO_2$ | 75 | $CeF_3$ | 25 | 13.1 | Alloy steel | 320 | 305 | S |
| 44 | $ZrO_2$ | 90 | $YbF_3$ | 10 | 10.5 | Cast steel | 350 | 330 | S |
| Comparative Example No. | | | | | | | | | |
| 4 | $ZrO_2$ | 100 | — | — | 10.2 | Cast iron | 390 | 45 | — |
| 5 | $Al_2O_3$ | 100 | — | — | 7.0 | SUS 316 | 80 | 0 | — |
| 1 | MgO | 100 | — | — | 12.5 | SUS 316 | 50 | 0 | — |

G: Good
S: Satisfactory

TABLE 8

| Example No. | Composition Oxide | Vol. % | Fluoride | Vol. % | Thermal Expansion Coefficient ($\times 10^{-6}/°C.$) | Metal Bonded | Flexural Strength of Juncture at Room Temperature (MPa) Before Heat Cycle Test | After Heat Cycle Test |
| --- | --- | --- | --- | --- | --- | --- | --- | --- |
| 45 | MgO | 20 | $CaF_2$ | 80 | 20.0 | Cu/Al | 260 | 240 |
| 46 | $GeO_2$ | 25 | $CaF_2$ | 75 | 18.0 | Monel | 220 | 210 |
| 47 | $WO_3$ | 30 | $CaF_2$ | 70 | 17.5 | Fe system amorphous alloy | 260 | 230 |
| 48 | $Fe_2O_3$ | 40 | $CaF_2$ | 60 | 16.3 | SUS 314 | 240 | 220 |
| 49 | $CaTiO_3$ | 60 | $CaF_2$ | 40 | 15.5 | SUS 316 | 225 | 215 |
| 50 | $MgFe_2O_4$ | 80 | $CaF_2$ | 20 | 14.3 | Alloy steel | 212 | 210 |

A ceramic sinter serving as an insertion material which is formed of $CaF_2$ as the metal fluoride and of $ZrO_2$ (containing 3 mol% $Y_2O_3$) as the metal oxide was interposed between SUS310 and $ZrSiO_4$ in order that they were contact-bonded by heating. Two kinds of the insertion materials, one containing 70 vol.% $CaF_2$ and the other 20 vol.% $CaF_2$, each having a thickness of 1 mm were prepared and interposed between SUS310 and $ZrSiO_4$, and they were contact-bonded at a temperature of 1000° C. for 60 minutes under vacuum. The thermal expansion coefficient of SUS310 is $19 \times 10^{-6}/°$ C., and in contrast with this, that of $ZrSiO_4$ is $4.2 \times 10^{-6}/°$ C., and hence it was conventionally difficult to use the composite body under high temperature circumstances because cracks were apt to generate. According to the present invention, the two pieces of the ceramic sinter insertion materials which differ in content of the metal fluoride were interposed so as to give a gradient to the thermal expansion coefficient at the juncture portion, thereby preventing the reduction of the heat cycle resistance and the reliability due to the thermal stress. After the heat cycle test has been performed, no abnormality could not be recognized at the juncture portion. Breakage caused by the flexural test occurs not in the juncture portion but on the side of $ZrSiO_4$.

An aluminum alloy and $Al_2O_3$ were thermally contact-bonded by applying the same method as above at a temperature of 600° C. during 30 minutes by employing a ceramic sinter insertion material composed of $AlF_3/Al_2O_3$ The thermal expansion coefficient of the aluminum alloy is $23 \times 10^{-6}/°$ C., and the thermal expansion coefficient of $Al_2O_3$ is $7 \times 10^{-6}/°$ C. There is a large difference between them. However, the bonding was effected by employing the ceramic sinter insertion material which contains $AlF_3$, whereby the breakage took place on the side of $Al_2O_3$ as in the case of the above example. Consequently, the reliability at the juncture portion was improved. In place of $Al_2O_3$ for the ceramic portion of the composite body, there can be employed such a non-oxide system ceramic whose thermal expansion coefficient is small, as, for instance, SiC, $Si_3N_4$, sialon or the like.

Figure 3:
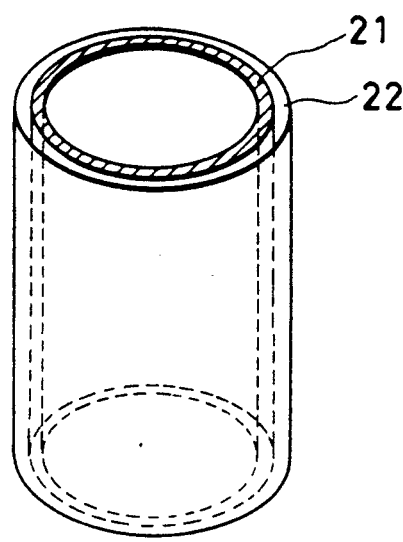
FIG. 3 shows one example of the composite body of the present invention.
Figure 4:
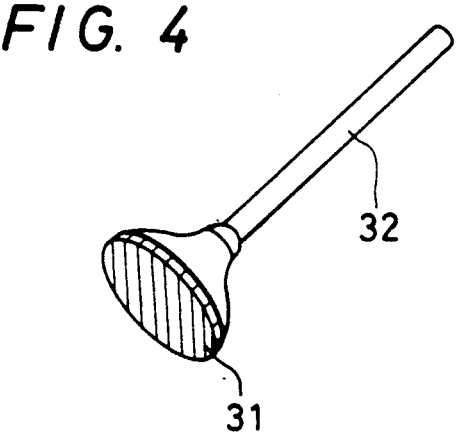
FIG. 4 shows another example of the composite body of the present invention.
Figure 5:
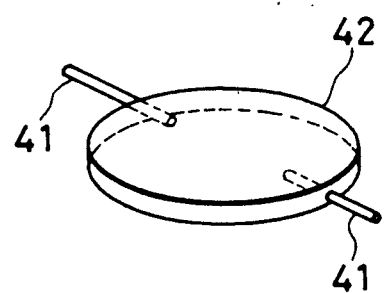
FIG. 5 shows still further example of the composite body of the present invention.

Examples of composite structural components which are composed of a ceramic sinter of the present invention and a metal material bonded therewith are shown in FIGS. 3, 4 and 5.

FIG. 3 shows a perspective view of a composite cylinder of the present invention used under high temperature circumstances. A liner 21 which is formed of a ceramic sinter of the present invention which is composed of $ZrO_2$ and $CaF_2$ (in a volume ratio of 45:55) is inserted into a metal sleeve 22 of carbon steel by shrink fit, thereby forming a cylinder liner. The cylinder liner was subjected to 1,000 tests in which heat load of room temperature to 500° C. was repeatedly applied to the cylinder liner. After the tests, the cylinder liner was examined and no abnormality was found between the sleeve 22 and the liner 21, and no generation of cracking or scaling off was found either. Since the average particle diameter of the high thermal expansion coefficient ceramics of the present invention is less than 2 μm, crystal grains are unlikely to be scaled off due to sliding movement, and the efficiency is not reduced by the increase in the clearance during the operation. Even when a composite cylinder were heated to 1,000 ° C. at atmospheric pressure, the sleeve 22 and the liner 21 were not separated from each other. From these facts it is clear that the ceramic sinter according to the present invention is good in oxidation resistance and wear resistance, and is therefore suitable as a material for a liner.

FIG. 4 shows a composite exhaust valve made of a ceramic sinter of a high thermal expansion coefficient and a metal in the following way. A valve seat 31 was formed of the ceramic sinter of Example 7 and was bonded to a valve stem 32 of SUS 316 at 1,000 ° C. in a vacuum by thermocompression bonding with a foil of Ti/Ni alloy inserted therebetween. This valve was incorporated into a diesel engine and the gas temperature was raised to 900° C. to carry out a 1,000-hour engine test. When the valve was examined after the end of the test, no abnormality was found.

Ordinarily, 70% of the heat from the combustion gas is received by the valve seat, and during high-load operation it is exposed to discharged gas of a temperature above 800° C. Since the thermal conductivity of this ceramic sinter is lower than that of a metal material, it is possible to suppress the rise in temperature of the valve even if the area of the valve seat is increased and, in addition, the increase in the inertia loading of the valve itself is reduced in comparison with a valve made of a metal material alone.

The valve seat 31 may be formed by spraying, for example, the powdered material of Example 1 on Table 1, onto the surface of the valve stem 32 by a known plasma spray coating process.

FIG. 5 shows a perspective view of a composite scroll valve of the present invention used in a turbo charger of an internal combustion engine. A disk valve 42 was formed of the ceramic sinter of Example 35 on Table 6 and was shrink-fitted to rotary shafts 41 of SUS316. The ceramic sinter disk valve 42 was exposed to exhaust gas of about 900° C. in the scroll of a turbo charger for 1,000 hours. After the engine test, the juncture portion of the ceramic and the metal revealed no abnormality upon examination.

As described above, a composite structural component which adopts the ceramic sinter of the present invention is superior to a conventional one, and is useful as a cylinder, cylinder liner, piston, piston head, turbocharger, rocker arm, cam, tappet, bearing, etc. of an internal combustion engine. It is also useful as an electronic component such as an IC package substrate and a fastener of a magnetic head, burner, blower and a biomaterial such as a substitute for a bone and a tooth.

Since the ceramic body according to the present invention exhibits a thermal expansion coefficient approximately the same as that of carbon steel, alloy steel and stainless steel, when it is integrally combined with a metal material, a composite is unlikely to produce cracking due to thermal stress, thereby greatly enhancing the reliability of a ceramic and metal composite structural body.

We claim:

1. A high thermal expansion coefficient ceramic sinter consisting essentially of metal oxide and metal fluoride, the amount of metal fluoride before sintering being 10-90 vol. %, said metal oxide being at least one material selected from the group consisting of $Al_2O_3$, MgO, $ZrO_2$, $BaTiO_3$, $GeO_2$, $Fe_2O_3$, $WO_3$, $CaTiO_3$ and $FgFe_2O_4$, and said metal fluoride being at least one material selected from the group having not less than 2.5 electronegativity difference between the fluorine and the metal element thereof.

2. A high thermal expansion coefficient ceramic sinter according to claim 1, wherein said metal fluoride is at least one selected from the group consisting of $CaF_2$, $MgF_2$, $SrF_2$, $AlF_3$, $ScF_3$, $YF_3$, $LaF_3$, $CeF_3$, $YbF_3$, $NbF_3$, $SmF_3$ and $EuF_3$.

3. A high thermal expansion coefficient ceramic sinter according to claim 1, wherein said metal oxide is at least one material selected from the group consisting of $Al_2O_3$, MgO, $ZrO_2$ and $BaTiO_3$, and said metal fluoride is at least one material selected from the group consisting of $CaF_2$, $MgF_2$, $AlF_3$, $ScF_3$, $YR_3$ and $LaF_3$.

4. A high thermal expansion coefficient ceramic sinter according to claim 1, wherein the thermal expansion coefficient of the ceramic sinter is $10-20 \times 10^{-6}/°$ C. at temperatures from room temperature to 500° C.

5. A high thermal expansion coefficient ceramic sinter according to claim 4, wherein the thermal expansion coefficient of the ceramic sinter is adjustable by controlling the amount of said metal fluoride.

6. A high thermal expansion coefficient ceramic sinter according to claim 1, wherein the thermal expansion coefficient of the ceramic sinter is $15-20 \times 10^{-6}/°$ C. at temperatures from room temperature to 500° C.

7. A high thermal expansion coefficient ceramic sinter according to claim 6, wherein the thermal expansion coefficient of the ceramic sinter is adjustable by controlling the amount of said metal fluoride.

8. A high thermal expansion coefficient ceramic sinter according to claim 1, wherein said metal fluoride is 25-90 volume % before sintering.

* * * * *